(12) United States Patent
Tu

(10) Patent No.: US 7,866,653 B2
(45) Date of Patent: Jan. 11, 2011

(54) DUPLEX DOCUMENT READER

(75) Inventor: Tung-Wen Tu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 11/969,568

(22) Filed: Jan. 4, 2008

(65) Prior Publication Data
US 2008/0179822 A1 Jul. 31, 2008

(30) Foreign Application Priority Data
Jan. 26, 2007 (TW) ................ 96102941 A

(51) Int. Cl.
*B65H 5/22* (2006.01)
*B65H 83/00* (2006.01)
*B65H 85/00* (2006.01)

(52) U.S. Cl. .................... 271/3.01; 271/3.14; 271/4.01; 271/186; 271/272; 271/65

(58) Field of Classification Search ............... 271/3.01, 271/3.14, 65, 186, 272, 4.01
See application file for complete search history.

(56) References Cited

U.S. PATENT DOCUMENTS

| | | | | | |
|---|---|---|---|---|---|
| 5,784,680 | A | * | 7/1998 | Taruki | 399/374 |
| 5,947,464 | A | * | 9/1999 | Takada | 271/3.03 |
| 5,995,801 | A | * | 11/1999 | Katsuta et al. | 399/367 |
| 6,203,003 | B1 | * | 3/2001 | Sato et al. | 271/3.01 |
| 6,951,427 | B2 | * | 10/2005 | Fukushima et al. | 400/621 |
| 7,021,619 | B2 | * | 4/2006 | Watanabe et al. | 271/3.14 |
| 7,415,239 | B2 | * | 8/2008 | Saito et al. | 399/388 |
| 7,621,518 | B2 | * | 11/2009 | Iesaki et al. | 271/3.14 |
| 2003/0047860 | A1 | * | 3/2003 | Takamatsu | 271/3.14 |
| 2004/0140606 | A1 | * | 7/2004 | Kobayashi et al. | 271/4.01 |
| 2004/0262837 | A1 | * | 12/2004 | Hamada et al. | 271/272 |
| 2007/0045945 | A1 | * | 3/2007 | Iwago | 271/272 |
| 2007/0080490 | A1 | * | 4/2007 | Tu | 271/3.14 |
| 2008/0111293 | A1 | * | 5/2008 | Shingai | 271/3.14 |
| 2008/0169596 | A1 | * | 7/2008 | Wu | 271/3.14 |

* cited by examiner

*Primary Examiner*—Stefanos Karmis
*Assistant Examiner*—Prasad V Gokhale
(74) *Attorney, Agent, or Firm*—Apex Juris, PLLC; Tracy M Heims

(57) ABSTRACT

The present invention discloses a duplex document feeder for installed in scanning devices such as facsimile machine, printer, scanner or multi function peripheral (MFP). The duplex document feeder can control the motion accuracy of the sheet and avoid the happening of jam. The duplex document feeder includes a pick-up module, a sheet-controlling roller module and a an ejection module. The pick-up module is used for feeding the sheet into a first feed channel; the sheet-controlling roller module provides a first nip force to feed the sheet outside the duplex document feeder and provides a second nip force to feed the sheet into the interior of the duplex document feeder again; the ejection module provides a third nip force to feed/eject the sheet into/from the duplex document feeder.

8 Claims, 8 Drawing Sheets ly to a duplex document feeder.

DUPLEX DOCUMENT READER

FIELD OF THE INVENTION

The present invention relates to a document feeder, and more particularly to a duplex document feeder.

BACKGROUND OF THE INVENTION

Nowadays, scanning devices are popularly used in daily and official affairs. The so-called scanning devices include, such as, fax machine, printer, scanner and multi function peripheral device. It is generally necessary for users to scan both sides of documents. Usually, a low-level scanning device does not provide such function and they have to turn over the sheet manually when performing a duplex scanning. However, it is highly time consuming and laboring when performing duplex scanning for a lot of documents. Besides, for saving space, the volume of the scanning device should not be too large.

Therefore, the advanced scanning device must have the function for automatically scanning double sides of document and would not occupied too large space. FIGS. 1A to 1D show an operation process of a conventional document feeder. As shown in FIG. 1A, a sheet 10 is fed into the document feeder by a pick-up module 20 and then transported to an eject module 40 via a feed module 30. The leading edge of the sheet 10 pushes the bottom of a guide strip 50 to enter the eject module 40. In the above transporting process, the content of the first face of the sheet 10 is scanned by a scanning module 60 of a scanning device 80. Please refer to FIG. 1B, which shows the situation when the trailing edge of the sheet 10 has passed through a first active roller 31 and a first idle roller 32 of the feed module 30. Under this situation, the sheet 10 is transported by the eject roller module 40, and a second active roller 41 and a second idle roller 42 of the eject roller module 40 have to generate a sufficient nip force to precisely control the movement of the sheet 10.

Please refer to FIG. 1C, which shows the situation when the first face of the sheet 10 had completely passed through the scanning module 60 via the rotation of the feed module 30 and the trailing edge of the sheet 10 had reached the eject module 40. Under this situation, the second active roller 41 of the eject roller module 40 starts to rotate reversely to transport the sheet 10 to the feed module 30 via the guiding of the guide strip 50, therefore, the image of the second face of the sheet 10 will be subsequently scanned by the scanning module 60. Last, referring to FIG. 1D, which shows an overlap in the eject module 40 occurred between the leading edge and the trailing edge of the sheet 10 because of the operation of the feed module 30. Under this situation, the second active roller 41 of the eject roller module 40 starts to operate with a positive rotation to make the leading edge of the sheet 10 exit from the document feeder, in the meantime, the second idle roller 42 still rotates in reverse to transport the trailing edge of the sheet 10 into the feed module 30.

The above-mentioned paragraphs illustrate the process of how the conventional document feeder performing the automatic duplex scanning. In the eject roller module 40 of the conventional document feeder, the nip force between the second active roller 41 and the second idle roller 42 must be large enough to precisely control the motion accuracy of the sheet 10, but as can be seen in FIG. 1D, if the nip force between the second active roller 41 and the second idle roller 42 is too large, the leading edge of the scanned sheet 10 will probably fail to be transported into the nip between the second active roller 41 and the second idle roller 42 and result in a jam condition. On the contrary, as can be seen in FIG. 1B, if the nip force between the second active roller 41 and the second idle roller 42 is insufficient, the second active roller 41 and the second idle roller 42 can not precisely transport the sheet 10 and result in a distorted scanning result.

In order to obviate the defects of the conventional document feeder, it is an object of the present invention to provide a duplex document feeder, in which a sufficient nip force is provided to precisely control the motion accuracy of the sheet. Furthermore, the jam will not happen in the scanning process by the present invention.

SUMMARY OF THE INVENTION

The major object of the present invention to provide a duplex document feeder, in which a sufficient nip force is provided to precisely control the motion accuracy of the sheet, and will not cause jam during the scanning process.

In accordance with an aspect of the present invention, there is provided A duplex document feeder for cooperating with a scanning device and transporting a sheet to a scanning module, the duplex document feeder comprising:

a pick-up module for guiding a first face of the sheet into a first feed channel and passing through the scanning module;

a sheet-controlling roller module comprising a first sheet-controlling roller, a second sheet-controlling roller, and a third sheet-controlling roller, wherein the first sheet-controlling roller and the second sheet-controlling roller are in contact with each other for generating a first nip force to feed the sheet outside of the duplex document feeder, and the second sheet-controlling roller and the third sheet-controlling roller are in contact with each other for generating a second nip force to feed the sheet into the interior of said the duplex document feeder; and an ejection module comprising a feeding/ejecting an active roller contacting and a pressing element, the active roller and the pressing element are in contact with each other for generating a third nip force by a positive rotation of said feeding/ejecting roller to feed the sheet outside of the duplex document feeder or to refeed the sheet into a second feed channel to make a second face of the sheet be scanned, wherein the third nip force is smaller than the first nip force and smaller than the second nip force.

DETAILED DESCRIPTION OF THE PREFERRED EMBODIMENT

Figure 1A:
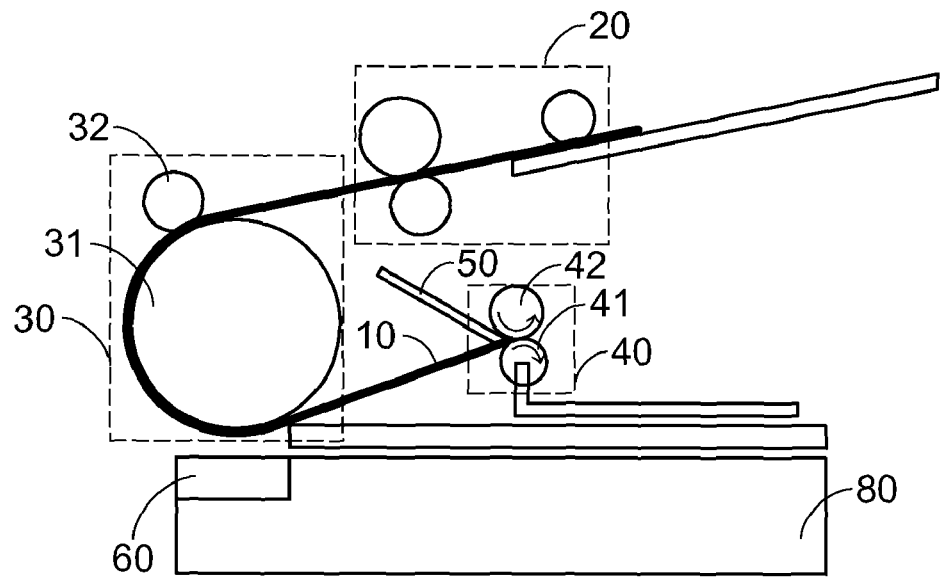
FIGS. 1A to 1D are sequential schematic side views showing a duplex scanning process of a conventional document feeder.
Figure 1B:
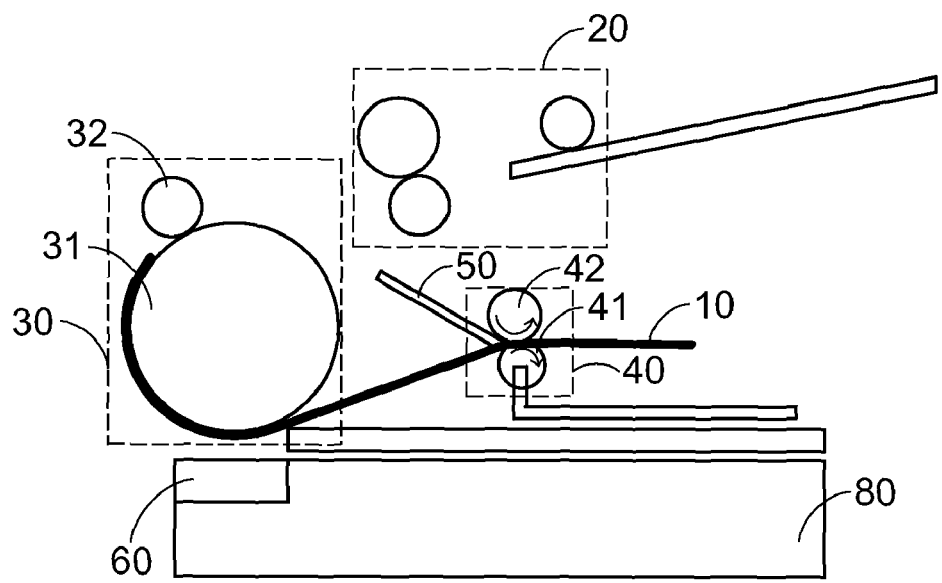
Figure 1C:
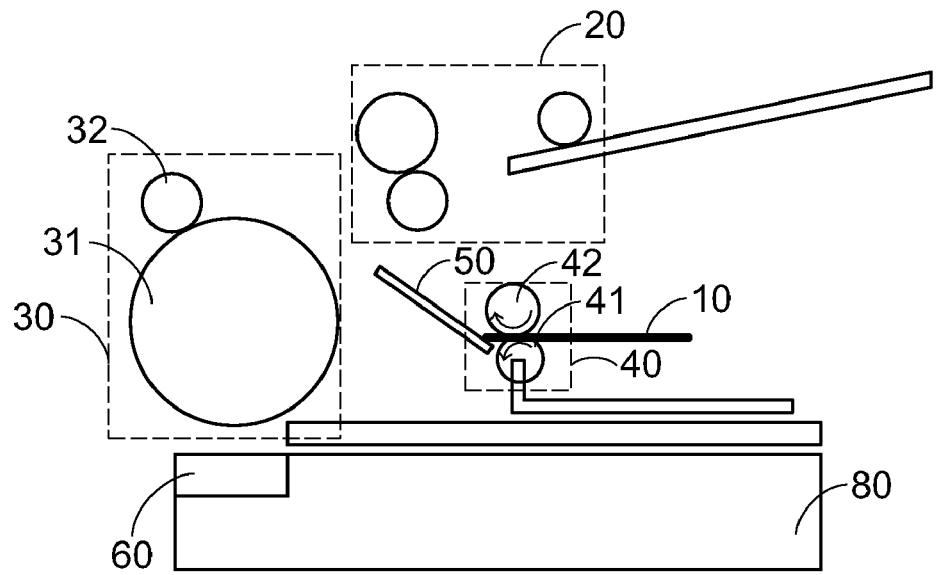
Figure 1D:
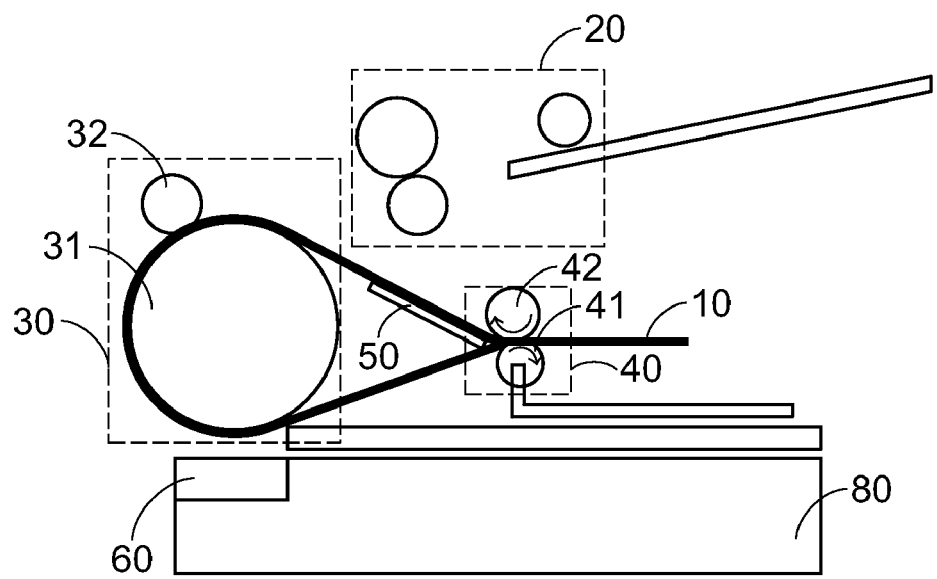
Figure 2:
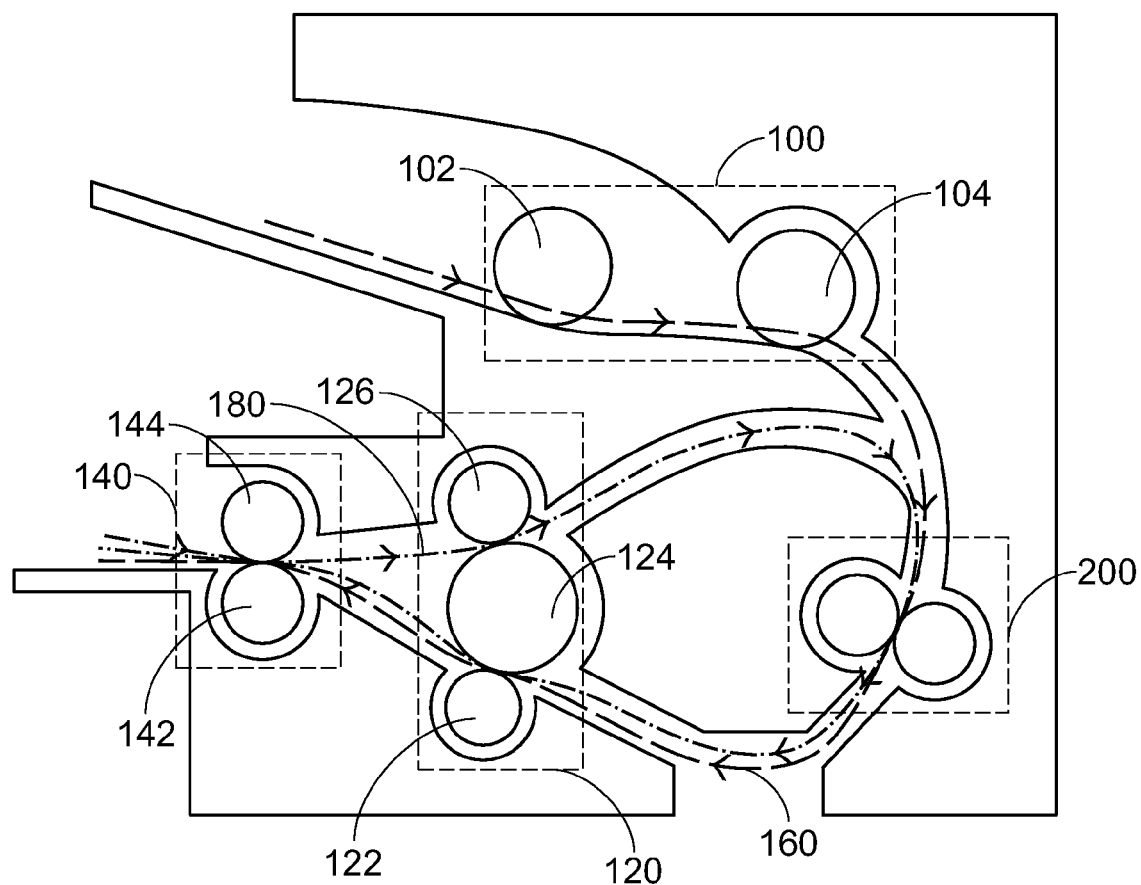
FIG. 2 is a schematic side view showing a preferred embodiment of duplex document feeder of the present invention.

The present invention provides a duplex document feeder to be installed in various scanning devices such as a facsimile machine, a printer, or a scanner for automatically turning over a sheet to accomplish a duplex scanning. Referring to FIG. 2, which is a schematic view showing a preferred embodiment a duplex document feeder provided by the present invention. The duplex document feeder comprises a pick-up module 100, a sheet-controlling roller module 120, an ejection module 140, a first feed channel 160, and a second feed channel 180. Besides, an auxiliary relay module 200 is selectively arranged in the duplex document feeder 180. The pick-up module 100 comprises a pick-up roller 102 and a separation roller 104. The sheet-controlling roller module 120 comprises a first sheet-controlling roller 122, a second sheet-controlling roller 124, and a third sheet-controlling roller 126. The ejection module 140 comprises a an active roller 142 and a pressing element 144, and in present embodiment, the pressing element 144 is a roller.

FIGS. 3A to 3E are side views showing a duplex document feeder provided by the present invention and installed in a scanning device 90. First, referring to FIG. 3A, a sheet 80 is fed into the duplex document feeder by the pick-up roller 102, and subsequently separated by the separation roller 104 for ensuring that only one single sheet 80 is entering into the duplex document feeder at a time. Next, referring to FIG. 3B, the sheet 80 is transported through the first feed channel 160 (as shown in FIG. 2) by the auxiliary relay module 200 and then into the ejection module 140 by a first nip force generated by the first sheet-controlling roller 122 and the second sheet-controlling roller 124. When the sheet 80 is transported into the election module 140, the active roller 142 keeps positive rotation to feed the sheet 80 outside the duplex document feeder. In the meanwhile, the first face of the sheet 80 will be able to pass through the scanning module 210 for the scanning device 90 to perform further operations such as scanning or storing the scanned image.

Figure 3A:
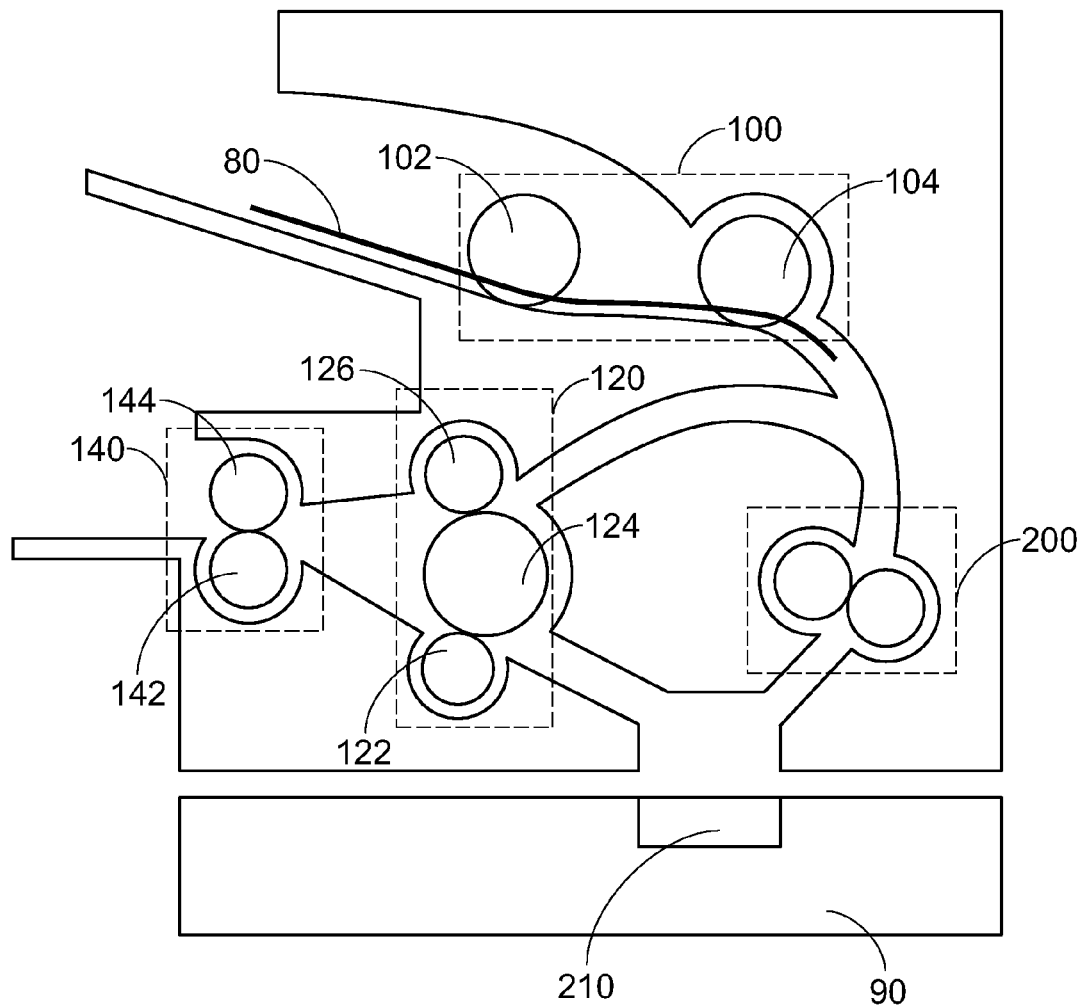
FIGS. 3A to 3E are schematic side views showing the sequential operation of the duplex document feeder installed in a scanning device of the present invention.
Figure 3B:
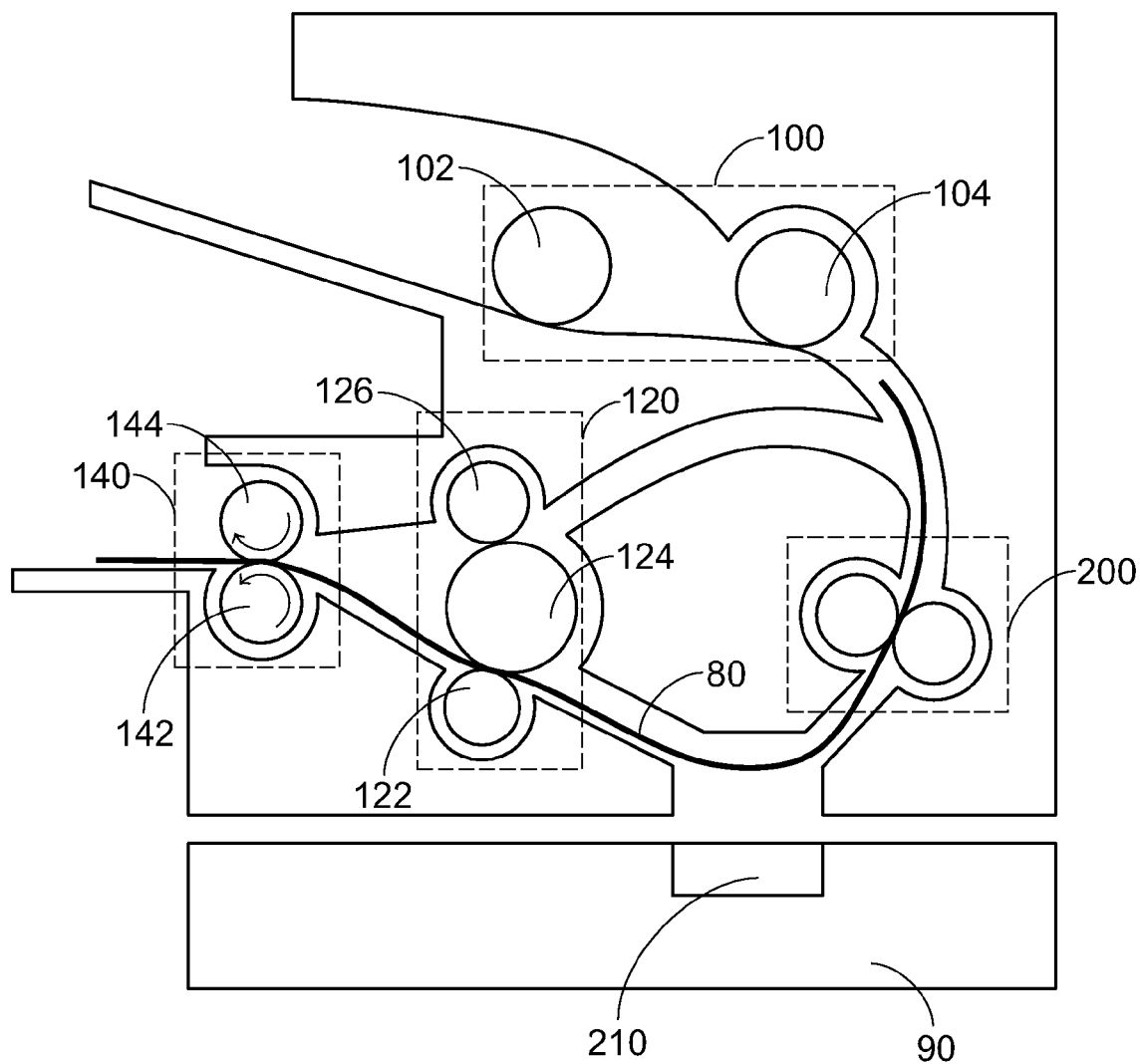
Figure 3C:
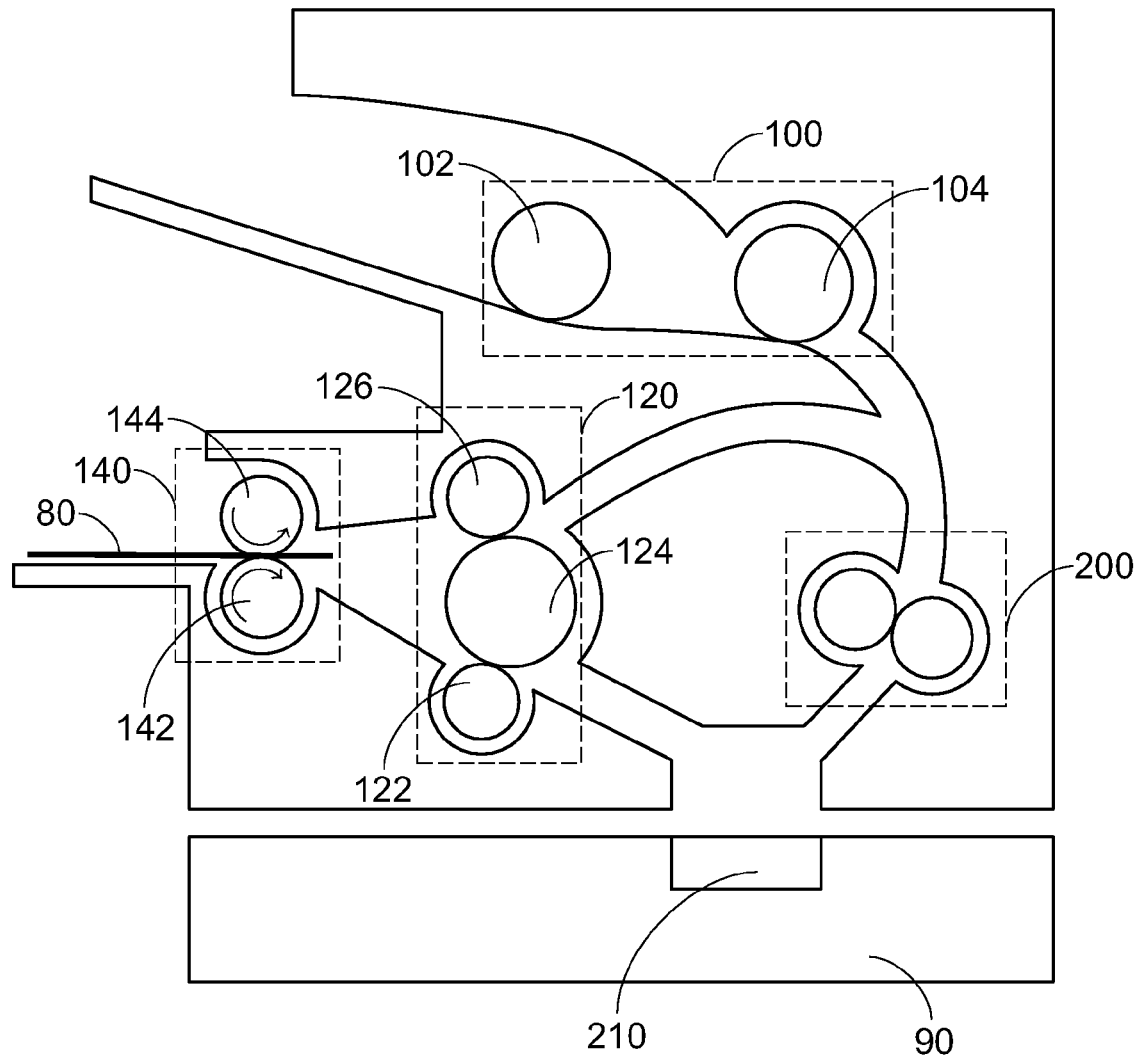
Figure 3D:
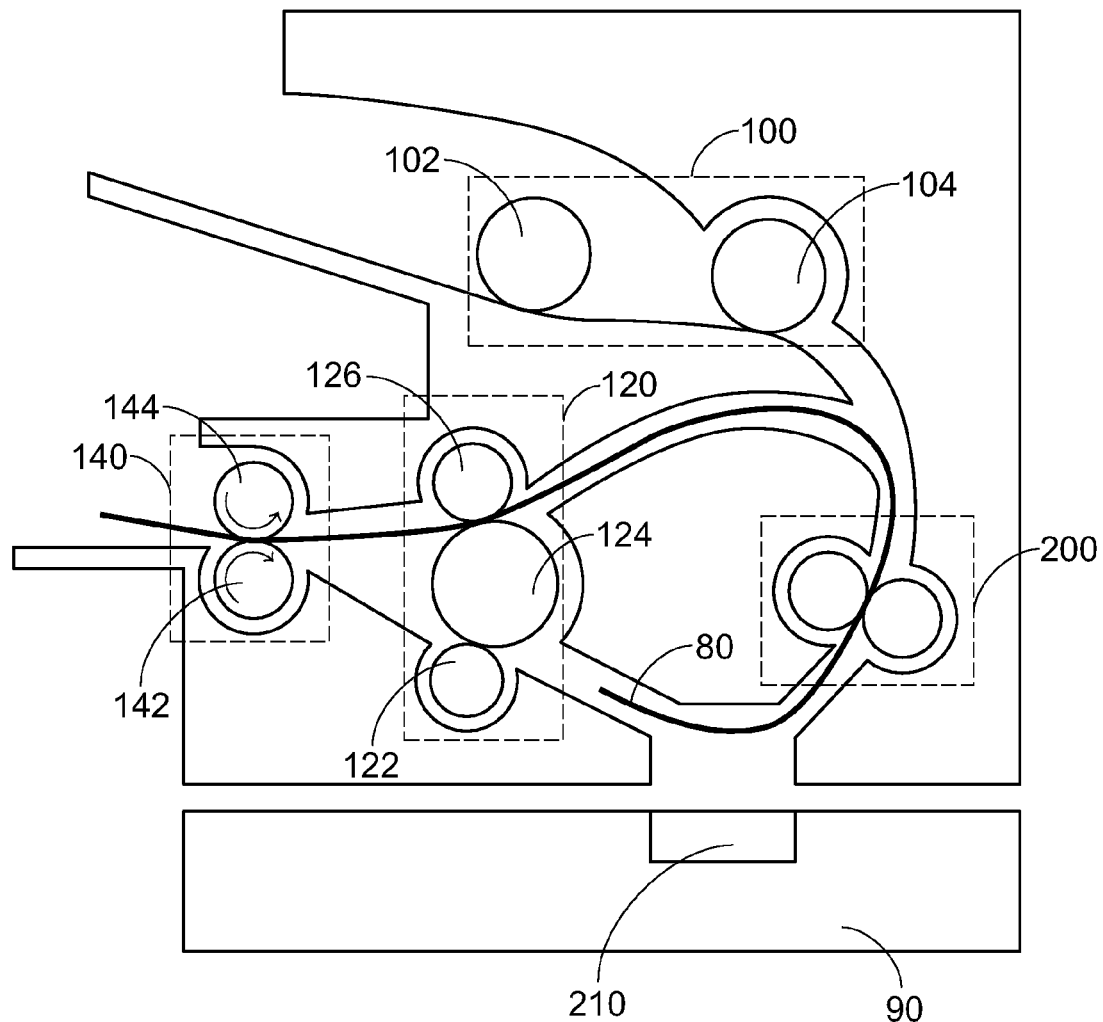
Figure 3E:
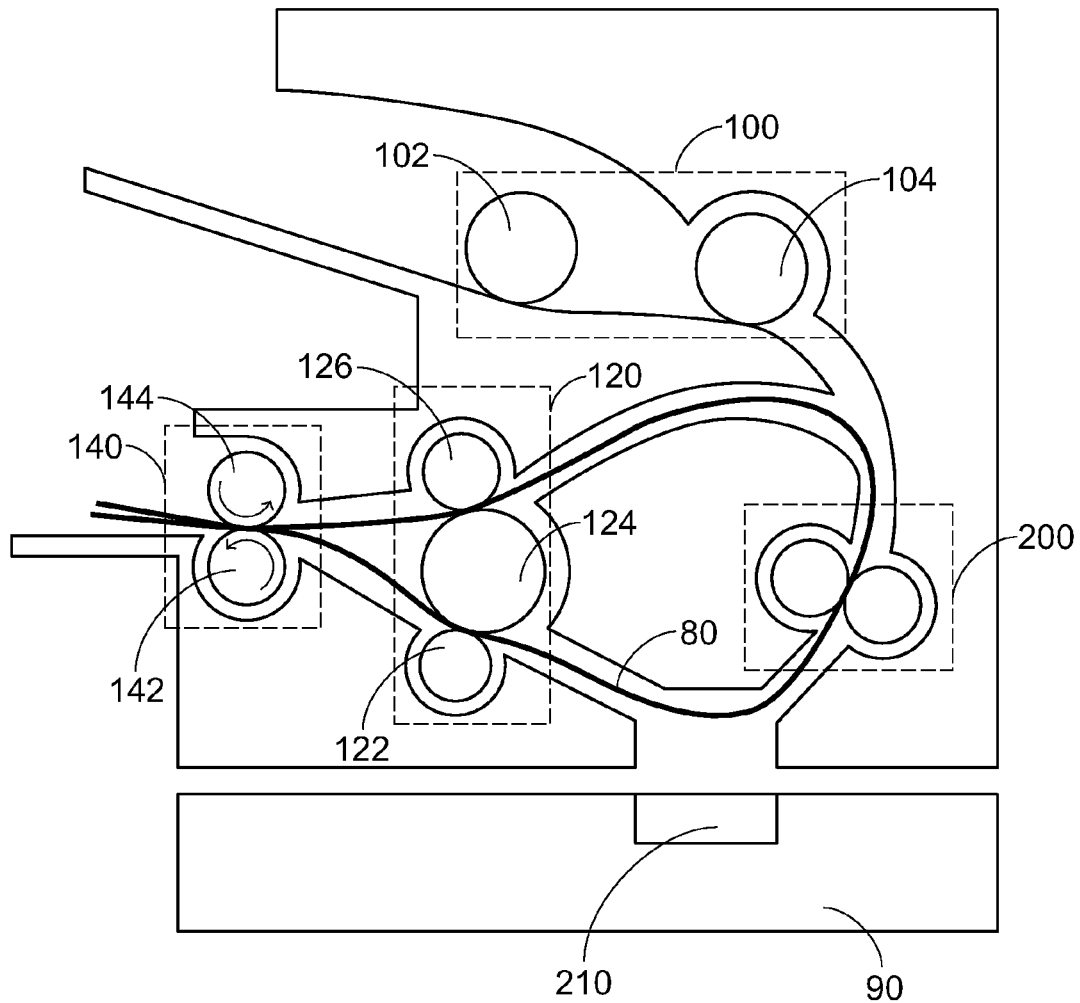

Referring to FIG. 3C, when the first face of the sheet 80 has been scanned completely and the sheet 80 has been transported into the ejection module 40, the active roller 142 rotates reversely for feeding the sheet 80 into the second feed channel 180 (as shown in FIG. 2) to make the second face of sheet 80 be scanned. Next, referring to FIG. 3D, which shows that the sheet 80 is transporting into the second feed channel 180 (as shown in FIG. 2) by a second nip force generated by the second sheet-controlling roller 124 and the third sheet-controlling roller 126. Furthermore, referring to FIG. 3E, which shows that when portion of the second face of the sheet 80 has been scanned and the leading edge of the sheet 80 has been transported into the ejection module 140 again, the active roller 142 will rotate positively to feed the leading edge of the sheet 80 outside the duplex document feeder. In the embodiments of the present invention, the first nip force generated by the first sheet-controlling roller 122 and the second sheet-controlling roller 124 and the second nip force generated by the second sheet-controlling roller 124 and the third sheet-controlling roller 126 are both several times (e.g., five times) larger than the third nip force generated by the active roller 142 and the pressing element 144, therefore, the sheet 80 will be successfully fed into the nip of the eject roller 142 and the pressing element 144 without jamming. Besides, the duplex document feeder provided by the present invention can precisely control the motion accuracy of the sheet 80 by the first and second nip forces generated by the sheet-controlling roller module 120, hence, both faces of the sheet could be successfully scanned.

In the above-described preferred embodiment of the present invention, a roller is used as the pressing element 144 in the eject module 140. However, other equivalent elements such as the an elastic slice can also be adopted as the pressing element 144 for generating a nip force with the eject roller 142 in the feeding/ejecting eject module 140. Besides, in the duplex document feeder provided by the present invention, the motion accuracy of the sheet 80 is preciously controlled by the sheet-controlling roller module 120, and the nip force generated by the eject module 140 is reduced to avoid jamming of the sheet 80.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex document feeder for cooperating with a scanning device and transporting a sheet to a scanning module, said duplex document feeder comprising:
    a pick-up module for guiding a first face of said sheet into a first feed channel and passing through said scanning module;
    a sheet-controlling roller module comprising a first sheet-controlling roller, a second sheet-controlling roller, and a third sheet-controlling roller, wherein said first sheet-controlling roller and said second sheet-controlling roller are in contact with each other for generating a first nip force to feed said sheet outside of said duplex document feeder, and said second sheet-controlling roller and said third sheet-controlling roller are in contact with each other for generating a second nip force to feed said sheet into the interior of said duplex document feeder; and
    an ejection module comprising an active roller and a pressing element, said active roller and said pressing element are in contact with each other for generating a third nip force to feed said sheet outside of said duplex document feeder or to refeed said sheet into a second feed channel to make a second face of said sheet be scanned, wherein said first nip force generated by said first sheet-controlling roller and said second sheet-controlling roller and said second nip force generated by said second sheet-controlling roller and said third sheet-controlling roller are both at least five times larger than said third nip force generated by said active roller and said pressing element and the motion accuracy of said sheet is thereby controlled by said first and second nip forces such that said sheet is successfully fed into the nip of said active roller and said pressing element without jamming as a result of an overlap of a leading edge and a trailing edge of said sheet.

2. The duplex document feeder of claim 1, wherein said pick-up module comprises a pick-up roller and a separation roller for ensuring that only one single said sheet is fed into said first feed channel at a time.

3. The duplex document feeder of claim 1, wherein said first sheet-controlling roller and said second sheet-controlling roller are arranged in said first feed channel.

4. The duplex document feeder of claim 1, wherein said second sheet-controlling roller and said third sheet-controlling roller are arranged in said second feed channel.

5. The duplex document feeder of claim 1, wherein said pressing element is a roller.

6. A duplex document feeder for cooperating with a scanning device and transporting a sheet to a scanning module, said duplex document feeder comprising:
    a pick-up module for guiding said sheet into a first feed channel and passing through said scanning module for a first face of said sheet to be scanned;

an ejection module comprising an active roller and a pressing element, wherein said active roller and said pressing element are in contact with each other for generating a third nip force; and a sheet-controlling roller module comprising a first sheet-controlling roller and a second sheet-controlling roller, wherein said first sheet-controlling roller and said second sheet-controlling roller are in contact with each other to generate a first nip force for transporting said sheet into said ejection roller module from said first feed channel, and said first nip force is at least five times larger than said third nip force.

7. The duplex document feeder of claim 6, wherein said sheet-controlling roller module further comprises a third sheet-controlling roller, wherein said second sheet-controlling roller and said third sheet-controlling roller are in contact with each other for generating a second nip force for transporting said sheet into a second feed channel from said sheet-controlling roller module for a second face of said sheet to be scanned, and said second nip force is larger than said third nip force.

8. The duplex document feeder of claim 6, wherein said pressing element is an idle roller.

* * * * *